United States Patent [19]

Nakaura et al.

[11] Patent Number: 5,208,754

[45] Date of Patent: May 4, 1993

[54] DEVICE FOR CALCULATING ESTIMATED VEHICLE ACCELERATION AND SPEED

[75] Inventors: Tohru Nakaura; Koji Takata, both of Itami, Japan

[73] Assignee: Sumitomo Electric Industries Ltd., Osaka, Japan

[21] Appl. No.: 820,372

[22] Filed: Jan. 14, 1992

[30] Foreign Application Priority Data

Jan. 14, 1991 [JP] Japan .................................. 3-002713

[51] Int. Cl.[5] .......................... G01P 3/00; B60K 23/00
[52] U.S. Cl. ........................... 364/426.01; 364/426.02; 180/197
[58] Field of Search ...................... 364/424.01, 424.05, 364/426.01, 426.02, 426.03, 426.04, 565, 566; 180/197; 303/95; 188/4 R, 8, 22, 23

[56] References Cited

U.S. PATENT DOCUMENTS 3,709,565  1/1973  Jonason et al. .
4,969,100  11/1990  Takata et al. .................. 364/426.02

Primary Examiner—Bentsu Ro
Attorney, Agent, or Firm—Sandler Greenblum & Bernstein

[57] ABSTRACT

A device for calculating estimated vehicle acceleration and speed for use in estimating vehicle speed Vv and vehicle acceleration Av, such that a subservient acceleration Az based on the wheel speed is used when $As > Az$ during acceleration or when $As < Az$ during deceleration, while the substitute acceleration As based on the gravity-type accelerometer is used in place of Az when $As < Az$ during acceleration or when $As > Az$ during deceleration.

22 Claims, 3 Drawing Sheets

DEVICE FOR CALCULATING ESTIMATED VEHICLE ACCELERATION AND SPEED

BACKGROUND OF THE INVENTION

1. Field of the Invention

The present invention relates to a device for calculating an estimated acceleration and speed of a vehicle as required for use in the wheel behavior control, such as an antilock brake control, and, more particularly, to a device for calculating the estimated acceleration and speed of a vehicle based on the wheel speed and the output of a gravity-type accelerometer.

2. Description of the Prior Art

In antilock brake control devices and other wheel behavior control devices, estimating the vehicle speed based on calculation of wheel slipping or spinning, and estimating the coefficient of friction between the tire and the road surface are important factors directly affecting the control performance of the device. Estimating the coefficient of friction between the tire and road is normally based on the estimated value of vehicle acceleration during control, and the estimated vehicle acceleration is calculated based on the estimated vehicle speed. Therefore, the performance of the wheel behavior control device is greatly dependent upon the precision of vehicle speed estimation.

However, if the vehicle speed is estimated from the wheel speed alone, the precision of the estimation would be reduced significantly when the tires slip or spin badly.

Therefore, if the estimated vehicle speed and estimated vehicle acceleration are obtained based on both the wheel speed and the acceleration obtained from a reliable accelerometer, the estimating precision can be significantly improved. A typical type of accelerometer is the gravity-type accelerometer.

However, as illustrated in FIG. 3, the gravity-type accelerometer detects acceleration by converting the displacement of a weight F caused by acceleration to an electrical signal using resistors, piezoelectric elements, differential transformers, and other devices.

Therefore, it may be preferable to use the estimated vehicle speed based on the wheel speed when the wheels are not in a state of excessive slipping or spinning, and to use the estimated vehicle speed based on the gravity-type accelerometer when the wheels are in a state of excessive slipping or spinning.

Following this line of reasoning in the design of a wheel behavior control system, at a moment when the determination is made that, excessive slipping or spinning has occurred or has ceased, it is necessary that the estimated vehicle speed obtained from the wheel speed and the estimated vehicle speed obtained from the gravity-type accelerometer be equal, and it is desirable that the estimated vehicle acceleration obtained from the wheel speed and the estimated vehicle acceleration obtained from the gravity-type accelerometer also be equal.

To satisfy these requirements, the problem is how to configure a means for calculating the estimated vehicle speed based on the wheel speed, a means for calculating the estimated vehicle speed based on the output of the corrected gravity-type accelerometer, and a means for determining when to switch from the former estimated vehicle speed to the latter estimated vehicle speed and when to switch back.

Further problems to be solved are how to configure the device so that, when the estimated vehicle speed is obtained, the estimated vehicle acceleration can also be obtained at the same time using the simplest possible operation, and how to control the degree of dependency on the gravity-type accelerometer according to the degree of the tire slipping or spinning.

SUMMARY OF THE INVENTION

The present invention has been developed with a view to substantially solving the above described problems and has for its essential object to provide an improved device for calculating estimated vehicle acceleration and speed.

In order to achieve the aforementioned object, a device for calculating estimated vehicle acceleration and speed for use in a vehicle having a gravity-type accelerometer, according to the present invention, comprises, means for detecting a wheel speed of at least one wheel of the vehicle at each calculation cycle; means for calculating a representative speed Vr based on said wheel speed; means for detecting a gravitationally detected acceleration Am by said gravity-type accelerometer; means for correcting the gravitationally detected acceleration Am to produce a substitute acceleration As; means for calculating an estimated vehicle acceleration Av and an estimated vehicle speed Vv based on said representative speed Vr; means for calculating a subservient acceleration Az wherein Az constitutes a part of the equations for calculating said estimated vehicle acceleration and speed Av and Vv; means for selecting either one of said subservient acceleration Az and said substitute acceleration As based on a comparison between said subservient acceleration Az and said substitute acceleration As and for outputting said selected one of said subservient acceleration Az and said substitute acceleration As to be used in place of said part of the equations for calculating Av and Vv in said means.

When excessive spinning occurs during vehicle acceleration, the selection means selects the estimated vehicle speed and the estimated vehicle acceleration based on the output of the gravity-type accelerometer and calculates the estimated vehicle speed based on it, and when the excessive spinning ceases (or disappears) during vehicle acceleration, selection means selects the calculation of the estimated vehicle speed and acceleration based on the output of the wheel speed.

Likewise, the selection means adopts the output of the gravity-type accelerometer only when the excessive slipping is observed.

Furthermore, if excessive slipping occurs during deceleration, the selection means selects the calculation of the estimated vehicle speed and the estimated vehicle acceleration based on the output of the gravity-type accelerometer, and if the excessive slipping converges during vehicle deceleration, selection means selects the calculation of the estimated vehicle speed and the estimated vehicle acceleration based on the output of the wheel speed.

BRIEF DESCRIPTION OF THE DRAWINGS

The present invention will become more fully understood from the detailed description given below and the accompanying diagrams wherein.

DETAILED DESCRIPTION OF THE PREFERRED EMBODIMENT

Figure 1:
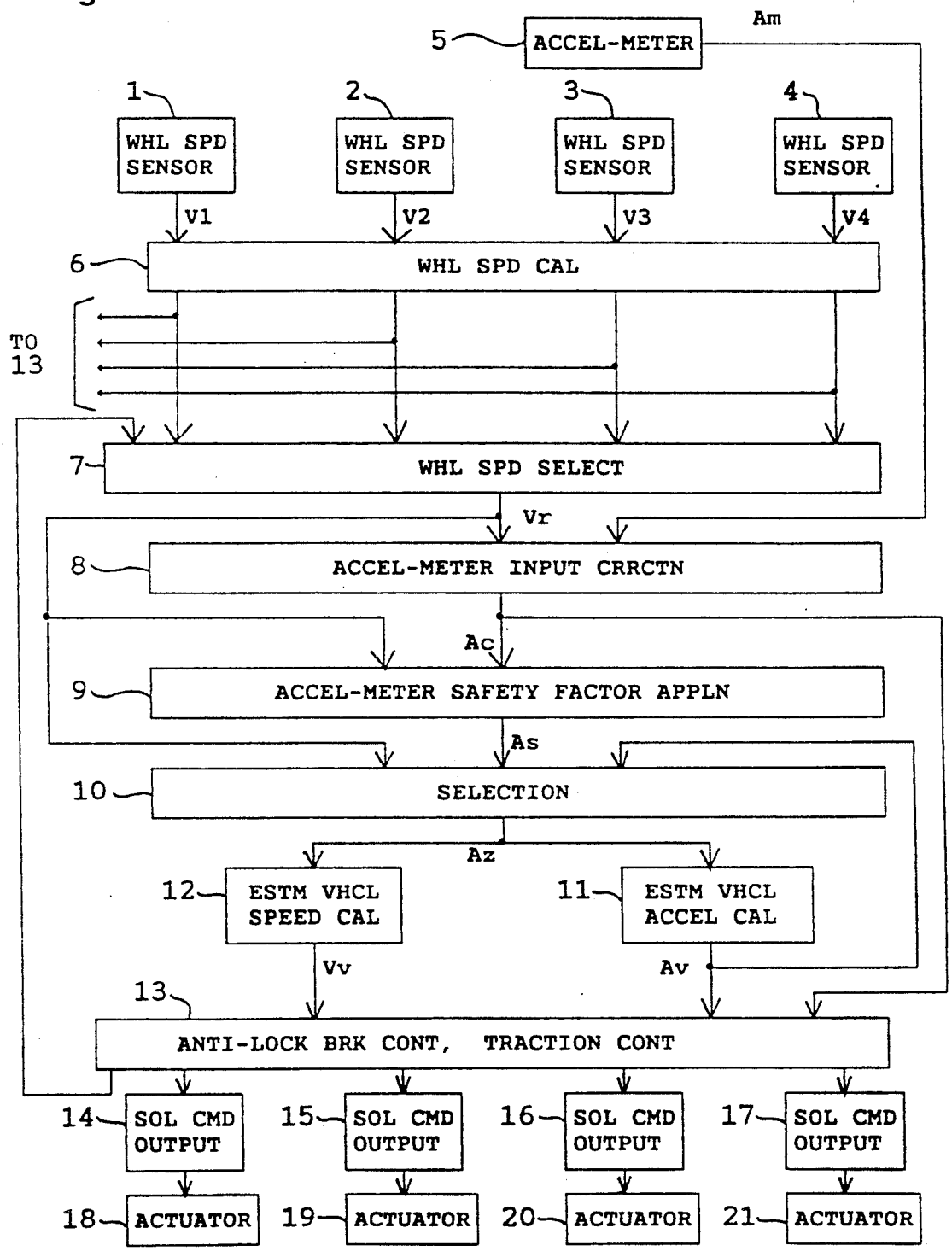
FIG. 1 is a block diagram of an antilock brake control system including a calculation device for estimated vehicle speed according to the present invention.

The principle of operation is described first. Throughout this description, the wheel speed of each of the four wheels is expressed as V1, V2, V3, and V4, respectively, the highest and the lowest of the wheel speeds is Vh and Vl, respectively, the representative speed is Vr, the estimated vehicle speed is Vv, the estimated vehicle acceleration is Av, the acceleration obtained directly from the gravity-type accelerometer is Am (referred to as a gravitationally detected acceleration), the acceleration obtained from the gravity-type accelerometer after a certain correction procedure is Ac (referred to as a corrected gravitationally detected acceleration), the substitute acceleration based on Ac and actually used to obtain the estimated vehicle speed and acceleration is As, the subservient acceleration for which As should be substitute is Az, and the filtering rates are m and n. It is to be noted that m and n are defined such that $0 \leq m \leq 1$, and $0 \leq n \leq 1$, and the unit of each acceleration value is the unit of gravity acceleration multiplied by the unit operation cycle time. This is because all differential calculations in this specification are expressed as the amount of change between successive operation cycles.

It is first necessary to obtain the representative speed Vr, which may be expressed as $$Vr = Vl$$

during acceleration and as $$Vr = Vh$$

during deceleration. When it is not possible to make an acceleration/deceleration determination, the value from the previous cycle may be used. The acceleration/deceleration determination will be described later.

A variety of other methods, such as eliminating an extraordinary value, may also be applicable, but the method described above is a good example which is simple and applicable in a wide range of situations.

Next, it is necessary to obtain the estimated vehicle speed Vv and the estimated vehicle acceleration Av from the representative speed Vr. These values should preferably be related to each other and be processed through a suitable filtering operation. Therefore, the most straight-forward method is defined by the equations:

$$dVv = (Vr - \underline{Vv})*m \quad (1)$$

$$Vv = \underline{Vv} + dVv \quad (2)$$

The underlined variables are values obtained in the previous operation cycle.

With this method, however, the filter delay is introduced to Vv, so that the estimated speed Vv may not coincide with the representative speed Vr even during constant acceleration.

A constant acceleration is the normal state of the wheel behavior control device, and it is extremely undesirable if, in this state, the estimated vehicle speed Vv differs from the representative speed Vr due to the filtering delay. An effective way of resolving this problem is to substitute the equation $$dVv = Av + (Vr - (\underline{Vv} + Av))*m \quad (4)$$

for equation (1) above. Thus, estimated speed Vv is guaranteed to coincide with the representative speed Vr during constant vehicle acceleration.

Assuming dVr defined by $$Vr = \underline{Vr} + dVr$$

is constant, the condition under which the estimated speed Vv coincides with the representative speed Vr is such that: if $$\underline{Vv} = \underline{Vr} = Vr - dVr$$

and $$Av = dVr$$

are satisfied, then, $$Vv = Vr = \underline{Vr} + dVr = \underline{Vv} + dVr$$

and $Av = \underline{Av} = dVr$ should be satisified.

Any sets of equations will satisfy the coincidence of Vv and Vr when dVr is constant, as far as the above condition is satisfied.

It will be easily be confirmed that the set of equations (4), (2) and (3) satisfies the above condition, while the set of equations (1), (2) and (3) does not satisfy the above condition.

For example, a set of equations such as:

$$Vv = Av + (Vr - \underline{Vv} - Av)*m$$

does also satisfy the above condition.

Of course, a stability is necessary such that any erroneous behavior of Vv or Av is automatically counterbalanced in the calculation of Vv or Av, such a stability is guaranteed by the filtering operation.

If the equation $$dVv = As \quad (5)$$

is substituted for equation (4), the estimated speed Vv will not be estimated based on the representative speed Vr, but will be estimated according to the substitute acceleration As.

In this case, instead of the above given equations (1), (2) and (3), the following equations (5), (2) and (3) are used for obtaining the estimated vehicle speed Vv and the estimated vehicle acceleration Av.

$$dVv = As \quad (5)$$

$$Vv = \underline{Vv} + dVv \quad (2)$$

$$Av = \underline{Av} + (dVv - \underline{Av})*n \quad (3)$$

Next, a diverging point at which Vv obtained from Vr and Vv obtained from As begin to diverge, and a joining point at which Vv obtained from As and Vr begin to re-intersect are considered.

If the substitute acceleration As is redefined as $$As = Av + (Vr - (Vv + Av))^*m \tag{8}$$

the relationship $$(As - Av)/m = Vr - (Vv + Av) \tag{9}$$

is obtained. Thus, at a moment when As and $\underline{Av}$ are equal, Vr will be equal to $(\underline{Vv} + \underline{Av})$. Here, Vr is the value from the present cycle, but $\underline{Vv}$ and $\underline{Av}$ are the values from the previous cycle. Thus, $(\underline{Vv} + \underline{Av})$ is the predicted value of Vv forecast from the previous cycle. When these values are equal, it means that the current cycle values of Vr and Vv will be approximately the same.

Therefore, at a time when equation (8) is satisfied the calculation is changed from equation (4) to equation (5), and at a time when equation (8) is again satisfied the calculation is changed back from equation (5) to equation (4). By so doing, it is possible to smoothly change from the estimated vehicle speed/acceleration based on the wheel speed to the estimated vehicle speed/acceleration based on the substitute acceleration obtained from the gravity-type accelerometer.

If equation (8) is expressed as an inequality equation where a sign of inequality used in the case of acceleration during tire spinning and a sign of inequality in the case of deceleration during tire slipping are reversed, the actual selection equations are obtained. Specifically, in the case of acceleration, providing $$As > Ac,$$

the selection equation is obtained as $$As < \underline{Av} + (\underline{Vr} - (\underline{Vv} + \underline{Av}))^*m \tag{8a}$$

and in the case of deceleration, providing
$$As < Ac,$$
the selection equation is obtained as
$$As > \underline{Av} + (Vr - (\underline{Vv} + \underline{Av}))^*m \tag{8b}$$

A value Ax representing the absolute value between As and Ac, i.e., $Ax = |As - Ac|$, expresses the safety factor, or the degree of uncertainty, of the accuracy of the correction of the gravity-type accelerometer. If the correction of the gravity-type accelerometer is sufficiently certain, Ax can be defined as zero.

Furthermore, when tire slipping or spinning is excessive and the vehicle speed and acceleration estimated from the wheel speed are completely unreliable (such a state is detected when there is a large difference between the right and left sides of the selection equation), it is necessary to rely upon the acceleration obtained from the gravity-type accelerometer, even though this is not necessarily error-free, and preferable to set the value Ax low.

However, when the judgment of slipping or spinning continues for an abnormally long period, it is preferable to set the value Ax high to avoid the potential danger of the corrected gravitationally detected acceleration Ac reflecting an extreme error.

To correct this, the value Ax may be increased according to the period of continued slipping or spinning, i.e., to the period during which the selection equation (8b) or (8a) is continuously satisfied.

If the output from gravity-type accelerometer is processed with the zero point correction only and not sensitivity correction, or if the applied sensitivity correction is considered unreliable, it is desirable to increase Ax according to the increase in the absolute value of Ac.

However, it is not only equation (8) which may satisfy the above continuation conditions. If equation (4) is substituted in equation (3), the equation $$Av = Av + (Av + Vr - (Vv + Av))^*m - Av)^*n$$

results. This equation may be modified to
$$Av = Av + (Vr - Vv - Av)^*m^*n$$

and further to $$Av = Av + (Av + (Vr - (Vv + Av))^*n - Av)^*m.$$

Thus, any part (continuous terms) which concludes the above equation as $Av = \underline{Av}$ when such a part is rendered $= \underline{Av}$, may be substituted for the right side of equation (8). Such a part is called the subservient acceleration Az hereafter.

Equation (8) shows one possible form of Az and can be expressed as:

$$Az = Av + (Vr - (Vv + Av))^*m \tag{10}$$

and, (8a) and (8b) can be expressed in generalized form as:
$$As < Az \tag{10a}$$

and $$As > Ax. \tag{10b}$$

The above discussion, however, shows that other forms of Az are possible, such as:

$$Az = Vr - Vv \tag{10'}$$

or $$Az = Av + (Vr - (Vv + Av))^*n \tag{10''}$$

while (10a) and (10b) remain applicable.

It should be noted equation (5) needs to be modified accordingly as follows:

$$dVv = As \tag{5}$$

corresponding to a case when equation (10) is employed, $$dVv = Av + (As - Av)^*m \tag{5'}$$

corresponding to a case when equation (10') is employed, or $$dVv = Av + (As - Av)^*m/n \tag{5''}$$

corresponding to a case when equation (10'') is employed.

Equations (2), (3) and (4) can be expressed as $$Vv = Vv + Av + (Vr - Vv - Av)^*m \tag{3'}$$

Combining equations (2'), (3') and (10), the following equations are derived:

$$Az = Av + (Vr - (Vv + Av))^*m$$
(10)

$$Vv = Vv + Az \tag{11}$$

$$Av = Av + (Az - Av) * n \tag{12}$$

Similarly, by combining equations (2'), (3') and (10'), $$Az = Vr - VV \tag{10'}$$

$$Vv = Vv + Av + (Az - Av) * m \tag{11'}$$

$$Av = Av + (Az - Av) * m * n \tag{12'}$$

are derived, and combining equations (2'), (3') and (10''), $$Az = Av + (Vr - (Vv + Av)) * n \tag{10''}$$

$$Vv = Vv + Av + (Az - Av) * m/n \tag{11''}$$

$$Av = Av + (Az - Av) * m \tag{12''}$$

are derived.

Previously discussed condition under which the estimated speed Vv coincides with the representative speed Vr, when dVr is constant, was such that:
if $$Vv = Vr = Vr - dVr$$

and $$Av = Av = dVr$$

should be satisfied. Equations (2') and (3') are examples that satisfy the above given condition.

Now, the generalized condition for Az is such that: if $$Vv = Vr = Vr - dVr$$

and $$Av = dVr$$

are satisfied, then, $$Az = Av = Av = dVr$$

should be satisfied.

The equations to define Vv and Av such as equations (2') and (3') can be expressed as including Az satisfying the condition of Az stated above, and Az in turn can be expressed as including Vr (i.e., Vr used to define Vv and Av can be expressed as used through Az). Even for a particular set of equations, e.g., equations (2') and (3'), various form of Az can be applied, e.g., equations (10), (10') or (10').

The determination of acceleration or deceleration is necessary in the above to select the representative speed Vr or to select the selection equation (10a) or (10b).

The selection is basically done such that the acceleration is selected when Vl is greater than $\underline{Vr}$, and the deceleration is selected when Vh is less than $\underline{Vr}$. However, it is also necessary to provide some way to prevent the false selection. For example, during the recovery from excessive spinning, the vehicle deceleration would be selected according to the basic rule, but actually the vehicle is in the accelerating process. Likewise, during the recovery from excessive slipping, the vehicle acceleration would be selected according to the basic rule, but actually the vehicle is in the deceleration process.

One means of accomplishing this is to assume a state of continued acceleration as long as equation (10a) is satisfied, and to likewise assume a state of continued deceleration as long as equation (10b) is satisfied. It is also possible to assume states of acceleration and deceleration during traction control and antilock brake control, respectively, and even more broadly to assume a deceleration state during the entire period in which the brakes are applied, i.e., when the brake switch is ON.

When $Vl < \underline{Vr} < Vh$ and an assumed determination of acceleration/deceleration is not made, Vr is defined as $Vr = \underline{Vr}$ as previously described, and it is possible to either eliminate calculation of equation (10) or to assume the same acceleration or deceleration state as in the previous cycle and apply equation (10a) or (10b).

An antilock brake control system comprising a device to calculate the estimated vehicle speed and acceleration according to the present invention is described hereinbelow.

Referring to FIG. 1, a block diagram of an antilock brake control system is shown. The system includes wheel speed sensors 1, 2, 3 and 4 to detect the rotation of the four wheels, a gravity-type accelerometer 5, a wheel speed calculator 6 to calculate the wheel speed of each of the four wheels based on the signals from the wheel speed sensors, a wheel speed selector 7 to select the maximum, minimum, or average wheel speed of the four wheels depending upon the conditions, and an accelerometer input correction device 8 to apply zero-point correction or other correction as required to the output Am of the gravity-type accelerometer (the detail of the accelerometer input correction device 8 is disclosed in the applicant's prior application, U.S.S.N. 07/811,942 (filed Dec. 23, 1991) entitled "ZERO-POINT CORRECTION DEVICE FOR A GRAVITY-TYPE ACCELEROMETER", the disclosure of which is expressly incorporated herein by reference in its entirety and which is based on Japanese patent application H2-406743 filed Dec. 26, 1990) to output the corrected gravitationally detected acceleration Ac.

The system further includes an accelerometer safety factor application unit 9 to further adjust the corrected gravitationally detected acceleration Ac using the safety factor Ax and output the substitute acceleration As used in place of the corrected gravitationally detected acceleration Ac, a selection unit 10 to calculate subservient acceleration Az according to equation (10) (or (10'), or (10') etc.) and to select whether to substitute As for Az or not by comparing Az and As, an estimated vehicle acceleration calculation unit 1 which calculates and outputs the estimated vehicle acceleration Av according to equation (12) (or (12'), or (12') etc.) using the selected acceleration Az or As, and an estimated vehicle speed calculation unit 12 which calculates and outputs the estimated vehicle speed Vv according to equation (11) (or (11'), or (11') etc.) using the selected acceleration Az or As.

The system yet further includes an antilock brake control unit 13 which refers to the estimated vehicle speed Vv and the estimated vehicle acceleration Av, evaluates wheel locking symptoms based on the wheel speed of each wheel output from the wheel speed calculator 6, and outputs an antilock control signal and solenoid units 14, 15, 16, 17 in a modulator for controlling the brake hydraulic pressure based on the antilock control signal, and actuators 18, 19, 20 and which drive the corresponding solenoids.

Figure 2:
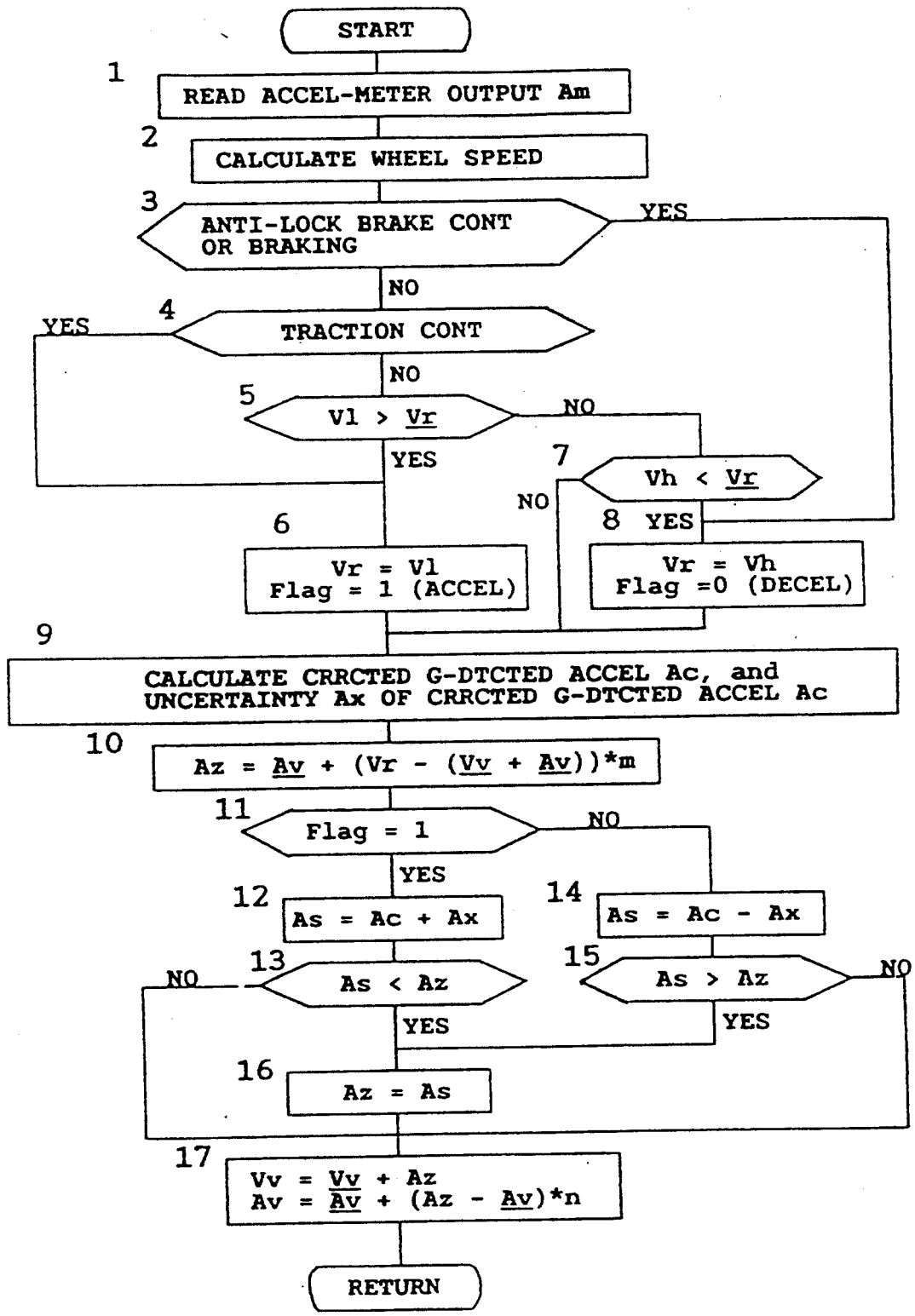
FIG. 2 is a flow chart showing the operation of the calculation device for estimated vehicle speed illustrated in FIG. 1.
Figure 3:
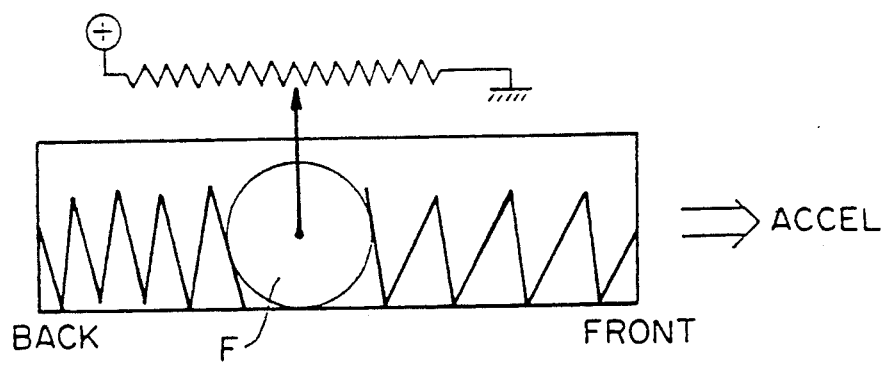
FIG. 3 is a simplified diagram of a gravity-type accelerometer.

The operation of this device is described hereinbelow with reference to the flow chart shown in FIG. 2.

At Step #1, the gravitationally detected acceleration Am is read from the accelerometer, and at Step #2 the wheel speed of each of the four wheels is calculated based on the outputs from the wheel speed sensors 1, 2, 3 and 4.

At Step #3 it is determined whether or not antilock brake control is being applied or whether or not the brake is applied. If this operation returns a YES, the vehicle is decelerating and the procedure advances to Step #8; if a NO is returned, it is determined at Step #4 whether or not traction control is being applied. If a YES is returned at Step #4, the vehicle is accelerating and the procedure advances to Step #6. If a NO is returned at both Step #3 and #4, the representative speed Vr from the previous cycle and the minimum speed V1 of the four wheels are compared at Step #5. If V1 is greater than Vr, the vehicle is accelerating and the procedure advances to Step #6.

However, if V1 is less than Vr, the procedure advances to Step #7 for comparing Vr and the maximum speed Vh of the four wheels. If Vh is less than Vr the vehicle is determined to be decelerating, and the procedure advances to Step #8.

If Vh is greater than Vr, i.e., if Vr is between Vh and V1, Vr is retained from the previous cycle Vr, the acceleration/deceleration state of the previous cycle is determined to continue, and the value from the previous cycle is retained. At Step #6 the acceleration flag is set and, at the same time, V1 is used as Vr for the current cycle. At Step #8 the deceleration flag is set and Vh is used as Vr for the current cycle.

At Step #9 zero correction and other necessary adjustments are applied to the gravitationally detected acceleration Am to calculate the corrected gravitationally detected acceleration Ac and, at also, the degree of uncertainty Ax of the Ac is calculated. At Step #10 the subservient acceleration Az in the estimated vehicle speed and acceleration calculated from the wheel speed is calculated according to equation (10) etc. At Step #11 the acceleration or deceleration state is checked by the flag.

If the vehicle is accelerating the substitute acceleration As is used which is equal to the sum of the corrected gravitationally detected acceleration Ac plus the degree of uncertainty Ax, and then at step #13 As is compared with Az obtained at step #10. If As is smaller than Az, As is substituted for Az and calculation proceeds to Step #17.

If the vehicle is decelerating, As is used which is equal in this case to the difference of Ac minus Ax at Step #14, and then at step #15 As is compared with Az obtained at step #10. If As is greater than Az, As is substituted for Az at Step #16.

If the result of Step #13 or #15 in which the selection equation is applied is NO, Az remains the value obtained from the wheel speed at Step #10. Once the value Az is determined in the above described manner, Vv and Av are obtained at Step #17 according to equations (11) etc. and (12) etc. and the calculation stops.

In the above described embodiment, the substitute acceleration As is described as obtained by adjusting the corrected gravitationally detected acceleration Ac by uncertainty Ax, but can be obtained in any other manner as long as the substitute acceleration As is based on the gravitationally detected acceleration Am.

A calculation device for the estimated vehicle speed according to the present invention comprises a means for calculating the estimated vehicle speed and other parameters from the wheel speed, and a means for calculating the estimated vehicle speed from a gravity-type accelerometer. The selection between these two calculation means is determined based on the occurrence or convergence of excessive slipping or spinning. Thus it is possible to obtain the estimated vehicle speed and the estimated vehicle acceleration with a high accuracy.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for calculating estimated vehicle acceleration and speed of a vehicle having a gravity-type accelerometer, comprising:
    means for detecting a wheel speed of at least one wheel of the vehicle at each calculation cycle;
    means for calculating a representative speed Vr based on said wheel speed;
    means for detecting a gravitationally detected acceleration Am by said gravity-type accelerometer;
    means for correcting the gravitationally detected acceleration Am to produce a substiute acceleration as;
    means for calculating an estimated vehicle acceleration Av and an estimated vehicle speed Vv based on said representative speed Vr;
    means for calculating a subservient acceleration Az which constitutes a part of the equations for calculating said estimated vehicle acceleration and speed, Av and Vv;
    means for selecting either one of said subservient acceleration Az and said substitute acceleration As based on a comparison between said subservient acceleration Az and said substitute acceleration As and for outputting said selected one of said subservient acceleration Az and said substitute acceleration As to be used in place of said part of the equations for calculating Av and Vv in said calculating means.

2. A device according to claim 1, wherein said estimated vehicle speed Vv is defined to be equal to said representative speed Vr when the vehicle acceleration is constant.

3. A device according to claim 2, wherein the equations for calculating Av and Vv are such that if $\underline{Vv} = \underline{Vr}$ and $\underline{Av} = d\underline{Vr}$, then, $Vv = Vr$ and $Av = dVr$, wherein each of the underlined variables represents the value obtained in a previous calculation cycle, "d" is a differential operator, and dVr represents an increment in Vr.

4. A device according to claim 3, wherein the equations for calculating Av and Vv are:

$$Vv = \underline{Vv} + \underline{Av} + (Vr - \underline{Vv} - \underline{Av})^{*}m$$

$$Av = \underline{Av} + (Vr - \underline{Vv} - \underline{Av})^{*}m^{*}n$$

wherein m and n are filtering rates with $0 \leq m \leq 1$ and $o \leq n \leq 1$.

5. A device according to claim 3, wherein said subservient acceleration Az and the equations for calculating Av and Vv are:

$$Az = \underline{Av} + (Vr - (\underline{Vv} + \underline{Av}))^{*}m$$

$$Vv = \underline{Vv} - Az$$

$$Av = \underline{Av} + (Az - \underline{Av})^{*}n$$

wherein m and n are filtering rates with $0 \leq m \leq 1$ and $0 \leq n \leq 1$.

6. A device according to claim 3, wherein said subservient acceleration Az and the equations for calculating Av and Vv are:

$$Az = Vr - Vv$$

$$Vv = Vv + Av + (Az - Av)^* m$$

$$Av = Av + (Az - Av)^* m^* n$$

wherein m and n are filtering rates with $0 \leq m \leq 1$ and $0 \leq n \leq 1$.

7. A device according to claim 3, wherein said subservient acceleration Az and the equations for calculating Av and Vv are:

$$Az = Av + (Vr - (Vv + Av))^* n$$

$$Vv = Vv + Av + (Az - Av)^* m/n$$

$$Av = Av + (Az - Av)^* m$$

wherein m and n are filtering rates with $0 \leq m \leq 1$ and $0 \leq n \leq 1$.

8. A device according to claim 2, wherein said subservient acceleration Az is such that if $\underline{Vv} = \underline{Vr}$ and $Av = dVr$, then, $Az = dVr$, wherein each of the underlined variables represents the value obtained in a previous calculation cycle, "d" is a differential operator, and dVr represents an increment in Vr.

9. A device according to claim 1, wherein said subservient acceleration Az is defined to be equal to the increment dVr when the vehicle acceleration is constant.

10. A device according to claim 1, further comprising means for detecting whether the vehicle is accelerating or decelerating.

11. A device according to claim 10, wherein the selection by said selecting means is further based on said acceleration/deceleration detection.

12. A device according to claim 10, wherein said selecting means selects said subservient acceleration Az when the vehicle acceleration is detected and at the same time said subservient acceleration Az is smaller than said substitute acceleration As, or when the vehicle deceleration is detected and at the same time said subservient acceleration Az is greater than said substitute acceleration As, and selects said substitute acceleration As when the vehicle acceleration is detected and at the same time said subservient acceleration Az is greater than said substitute acceleration As, or when the vehicle deceleration is detected and at the same time said subservient acceleration Az is smaller than said substitute acceleration As.

13. A device according to claim 10, wherein said means for calculating the representative speed Vr detects the maximum speed Vh and minimum speed Vl among the calculated wheel speeds, sets the minimum speed Vl as the representative speed Vr when the vehicle acceleration is detected, sets the maximum speed Vh as the representative speed Vr when the vehicle deceleration is detected, and maintains the previously detected representative speed $\underline{Vr}$ as the present representative speed Vr when neither the vehicle acceleration nor vehicle deceleration is detected.

14. A device according to claim 13, wherein said means for detecting whether the vehicle is accelerating or decelerating detects vehicle acceleration when $\underline{Vr} < Vl$, and detects vehicle deceleration when $\underline{Vr} \leq Vh$.

15. A device according to claim 10, wherein said means for detecting whether the vehicle is accelerating or decelerating maintains the detected result as long as said selecting means is selecting the substitute acceleration As.

16. A device according to claim 10, further comprising antilock brake control means and traction control, for detecting whether the vehicle is accelerating or decelerating detects vehicle acceleration when said traction control means is activated, and detects vehicle deceleration when said antilock brake control means is activated.

17. A device according to claim 10, wherein said means for detecting whether the vehicle is accelerating or decelerating detects vehicle deceleration when a braking is manually applied.

18. A device according to claim 10, wherein said correcting means comprises means for correcting the gravitationally detected acceleration Am to produce a corrected gravitationally detected acceleration Ac, means for calculating an uncertainty Ax of said corrected gravitationally detected acceleration Ac, and means for calculating said substitute acceleration As based on said corrected gravitationally detected acceleration Ac and said uncertainty Ax.

19. A device according to claim 18, wherein said means for calculating the substitute acceleration As calculates $$As = Ac + Ax$$

when the vehicle acceleration is detected, and calculates $$As = Ac - Ax$$

when the vehicle deceleration is detected.

20. A device according to claim 18, wherein said uncertainty Ax is calculated as a relatively small value when an absolute value of a difference between the substitute acceleration As and the subservient acceleration Az is relatively large.

21. A device according to claim 18, wherein said uncertainty Ax is calculated as a gradually increasing value when said selecting means continues to select said substitute acceleration As.

22. A device according to claim 18, wherein said uncertainty Ax is calculated as a relatively large value when said corrected gravitationally detected acceleration Ac is relatively large.

* * * * *

UNITED STATES PATENT AND TRADEMARK OFFICE
CERTIFICATE OF CORRECTION

PATENT NO. : 5,208,754

DATED : May 4, 1993

INVENTOR(S) : T. NAKAURA et al.

It is certified that error appears in the above-indentified patent and that said Letters Patent is hereby corrected as shown below:

At column 3, line 56, change "dVv=(Vr-Vv)*m" to ---dVv=(Vr-$\underline{Vv}$)*m---.

At column 3, line 58, change "Vv=Vv+dVv" to ---Vv=$\underline{Vv}$+dVv---.

At column 3, line 59, insert ---Av=$\underline{Av}$+(dVv-$\underline{Av}$)*n(3)---.

At column 4, line 5, change "dVv=Av+(Vr-(Vv+Av))*m" to ---dVv=$\underline{Av}$+(Vr-($\underline{Vv}$+$\underline{Av}$))*m---.

At column 4, line 12, change "Vr=Vr+dVr" to ---Vr=$\underline{Vr}$+dVr---.

At column 4, line 18, change "Vv=Vr=Vr-dVr" to ---$\underline{Vv}$=$\underline{Vr}$=Vr-dVr---.

At column 4, line 22, change "Av=dVr" to ---$\underline{Av}$=dVr---.

At column 4, line 25, change "Vv=Vr=Vr+dVr=Vv+dVr" to ---Vv=Vr=$\underline{Vr}$+dVr=$\underline{Vv}$+dVr---.

At column 4, line 27, change "Av=Av=dVr" to ---Av=$\underline{Av}$=dVr---.

UNITED STATES PATENT AND TRADEMARK OFFICE
CERTIFICATE OF CORRECTION

PATENT NO. : 5,208,754
DATED : May 4, 1993
INVENTOR(S) : T. NAKAURA et al.

Page 2 of 7

It is certified that error appears in the above-indentified patent and that said Letters Patent is hereby corrected as shown below:

At column 4, line 39, change "Vv=Av+(Vr-Vv-Av)*m" to ---Av=$\underline{Av}$+(Vr-$\underline{Vv}$-$\underline{Av}$)*m---.

At column 4, line 40, insert ---Vv=$\underline{Vv}$+Av---.

At column 4, line 60, change "Vv=Vv+dVv" to ---Vv=$\underline{Vv}$+dVv---.

At column 4, line 62, change "Av=Av+(dVv-Av)*n" to ---Av=$\underline{Av}$+(dVv-$\underline{Av}$)*n---.

At column 5, line 2, change "As=Av+(Vr-(Vv+Av))*m" to ---As=$\underline{Av}$+(Vr-($\underline{Vv}$+$\underline{Av}$))*m---.

At column 5, line 5, change "(As-Av)/m=Vr-(Vv+Av)" to ---(As-$\underline{Av}$)/m=Vr-($\underline{Vv}$+$\underline{Av}$)---.

At column 6, line 7, change "Av=Av+(Av+Vr-(Vv+Av))*m-Av)*n" to ---Av=$\underline{Av}$+($\underline{Av}$+Vr-($\underline{Vv}$+$\underline{Av}$))*m-$\underline{Av}$)*n---.

At column 6, line 10, change "Av=Av+(Vr-Vv-Av)*m*n" to ---Av=$\underline{Av}$+(Vr-$\underline{Vv}$-$\underline{Av}$)*m*n---.

At column 6, line 14, change "Av=Av+(Av+(Vr-(Vv+Av))*n-Av)*m" to ---Av=$\underline{Av}$+($\underline{Av}$+(Vr-($\underline{Vv}$+$\underline{Av}$))*n-$\underline{Av}$)*m---.

UNITED STATES PATENT AND TRADEMARK OFFICE
CERTIFICATE OF CORRECTION

PATENT NO. : 5,208,754
DATED : May 4, 1993
INVENTOR(S) : T. NAKAURA et al.

It is certified that error appears in the above-indentified patent and that said Letters Patent is hereby corrected as shown below:

At column 6, line 24, change "$Az=Av+(Vr-(Vv+Av))*m$" to ---$Az=\underline{Av}+(Vr-(\underline{Vv}+\underline{Av}))*\underline{m}$---.

At column 6, line 36, change "$Az=Vr-Vv$" to ---$Az=Vr-\underline{Vv}$---.

At column 6, line 40, change "$Az=Av+(Vr-(Vv+Av))*n$" to ---$Az=\underline{Av}+(Vr-(\underline{Vv}+\underline{Av}))*n$---.

At column 6, line 50, change "$dVv=Av+(As-Av)*m$" to ---$dVv=\underline{Av}+(As-\underline{Av})*\underline{m}$---.

At column 6, line 55, change "$dVv=Av+(As-Av)*m/n$" to ---$dVv=\underline{Av}+(As-\underline{Av})*\underline{m}/n$---.

At column 6, line 60, change "$Vv=Vv+Av+(Vr-Vv-Av))*m$" to ---$Vv=\underline{Vv}+\underline{Av}+(Vr-Vv-\underline{Av}))*\underline{m}$ (2')---.

At column 6, line 60, before "(3')" insert ---$Av=\underline{Av}+(Vr-Vv-\underline{Av})*\underline{m}*n$---.

At column 6, line 65, change "$Az=Av+(Vr-(Vv+Av))*m$" to ---$Az=\underline{Av}+(Vr-\underline{Vv}+\underline{Av})*\underline{m}$ (10)---.

At column 6, line 66, delete "(10)".

UNITED STATES PATENT AND TRADEMARK OFFICE
CERTIFICATE OF CORRECTION

PATENT NO. : 5,208,754
DATED : May 4, 1993
INVENTOR(S) : T. NAKAURA et al.

It is certified that error appears in the above-indentified patent and that said Letters Patent is hereby corrected as shown below:

At column 6, line 68, change "Vv=Vv+Az" to ---Vv=$\underline{Vv}$+Az---.

At column 7, line 2, change "Av=Av+(Az-Av)*n" to ---Av=$\underline{Av}$+(Az-$\underline{Av}$)*n---.

At column 7, line 5, change "Az=Vr-VV" to ---Az=Vr-$\underline{Vv}$---.

At column 7, line 7, change "Vv=Vv+Av+(Az-Av)*m" to ---Vv=$\underline{Vv}$+$\underline{Av}$+(Az-$\underline{Av}$)*m---.

At column 7, line 9, change "Av=Av+(Az-Av)*m*n" to ---Av=$\underline{Av}$+(Az-$\underline{Av}$)*m*n---.

At column 7, line 12, change "Az=Av+(Vr-(Vv+Av))*n" to ---Az=$\underline{Av}$+(Vr-($\underline{Vv}$+$\underline{Av}$))*n---.

At column 7, line 14, change "Vv=Vv+Av+(Az-Av)*m/n" to ---Vv=$\underline{Vv}$+$\underline{Av}$+(Az-$\underline{Av}$)*m/n---.

At column 7, line 16, change "Av=Av+(Az-Av)*m" to ---Av=$\underline{Av}$+(Az-$\underline{Av}$)*m---.

UNITED STATES PATENT AND TRADEMARK OFFICE
CERTIFICATE OF CORRECTION

PATENT NO. : 5,208,754
DATED : May 4, 1993
INVENTOR(S) : T. NAKAURA et al.

It is certified that error appears in the above-indentified patent and that said Letters Patent is hereby corrected as shown below:

At column 7, line 23, change "Vv=Vr=Vr-dVr" to ---$\underline{Vv}=\underline{Vr}=Vr-dVr$---.

At column 7, line 27, change "Av=Av=dVr" to ---$\underline{Av}=dVr$ are satisfied, then $Vv=Vr=\underline{Vr}+dVr=\underline{Vv}+dVr$ and $Av=\underline{Av}=dVr$---.

At column 7, line 33, change "Vv=Vr=Vr-dVr" to ---$\underline{Vv}=\underline{Vr}=Vr-dVr$---.

At column 7, line 37, change "Av=dVr" to ---$\underline{Av}=dVr$---.

At column 7, line 41, change "Az=Av=Av=dVr" to ---$Az=Av=\underline{Av}=dVr$---.

At column 7, line 50, change "(10')." (second occurrence) to ---(10'').---.

At column 8, line 44, change "(10')" (second occurrence) to ---(10'')---.

At column 8, line 46, change "1" to ---11---.

At column 8, line 48, change "(12')" (second occurrence) to ---(12'')---.

UNITED STATES PATENT AND TRADEMARK OFFICE
CERTIFICATE OF CORRECTION

PATENT NO. : 5,208,754
DATED : May 4, 1993
INVENTOR(S) : T. NAKAURA et al.

It is certified that error appears in the above-indentified patent and that said Letters Patent is hereby corrected as shown below:

At column 10, line 25 (claim 1, line 12), change "as" to ---As---.

At column 10, line 55 (claim 4, line 4), change "Vv=Vv+Av+(Vr-Vv-Av)*m" to ---Vv=$\underline{Vv}$+$\underline{Av}$+(Vr-Vv-$\underline{Av}$)*m---.

At column 10, line 57 (claim 4, line 6), change "Av=Av+(Vr-Vv-Av)*m*n" to ---Av=$\underline{Av}$+(Vr-Vv-$\underline{Av}$)*m*n---.

At column 10, line 60 (claim 4, line 9), change "o≤n≤1." to ---0≤n≤1.---.

At column 10, line 65 (claim 5, line 5), change "Az=Av+(Vr-(Vv+Av))*m" to ---Az=$\underline{Av}$+(Vr-($\underline{Vv}$+$\underline{Av}$))*m---.

At column 10, line 67 (claim 5, line 7), change "Vv=Vv-Az" to ---Vv=$\underline{Vv}$+Az---.

At column 10, line 69 (claim 5, line 9), change "Av=Av+(Az-Av)*n" to ---Av=$\underline{Av}$+(Az-$\underline{Av}$)*n---.

At column 11, line 7 (claim 6, line 5), change "Az=Vr-Vv" to ---Az=Vr-$\underline{Vv}$---.

At column 11, line 9 (claim 6, line 7), change "Vv=Vv+Av+(Az-Av)*m" to ---Vv=$\underline{Vv}$+$\underline{Av}$+(Az-$\underline{Av}$)*m---.

UNITED STATES PATENT AND TRADEMARK OFFICE
CERTIFICATE OF CORRECTION

PATENT NO. : 5,208,754
DATED : May 4, 1993
INVENTOR(S) : T. NAKAURA et al.

It is certified that error appears in the above-indentified patent and that said Letters Patent is hereby corrected as shown below:

At column 11, line 11 (claim 6, line 9), change "Av=Av+(Az-Av)*m*n" to ---Av=$\underline{Av}$+(Az-$\underline{Av}$)*m*n---.

At column 11, line 20 (claim 7, line 5), change "Az=Av+(Vr-(Vv+Av))*n" to ---Az=$\underline{Av}$+(Vr-($\underline{Vv}$+$\underline{Av}$))*n---.

At column 11, line 22 (claim 7, line 7), change "Vv=Vv+Av+(Az-Av)*m/n" to ---Vv=$\underline{Vv}$+$\underline{Av}$+(Az-$\underline{Av}$)*m/n---.

At column 11, line 24 (claim 7, line 9), change "Av=Av+(Az-Av)*m" to ---Av=$\underline{Av}$+(Az-$\underline{Av}$)*m---.

At column 12, line 10 (claim 14, line 4), change "$\underline{Vr \leq Vh}$" to ---$\underline{Vr>Vh}$---.

At column 12, line 17 (claim 16, line 2), change "control," to ---control means, wherein said means---.

Signed and Sealed this

Eleventh Day of March, 1997

BRUCE LEHMAN

Attest:

Attesting Officer

Commissioner of Patents and Trademarks